United States Patent Office 3,745,180
Patented July 10, 1973

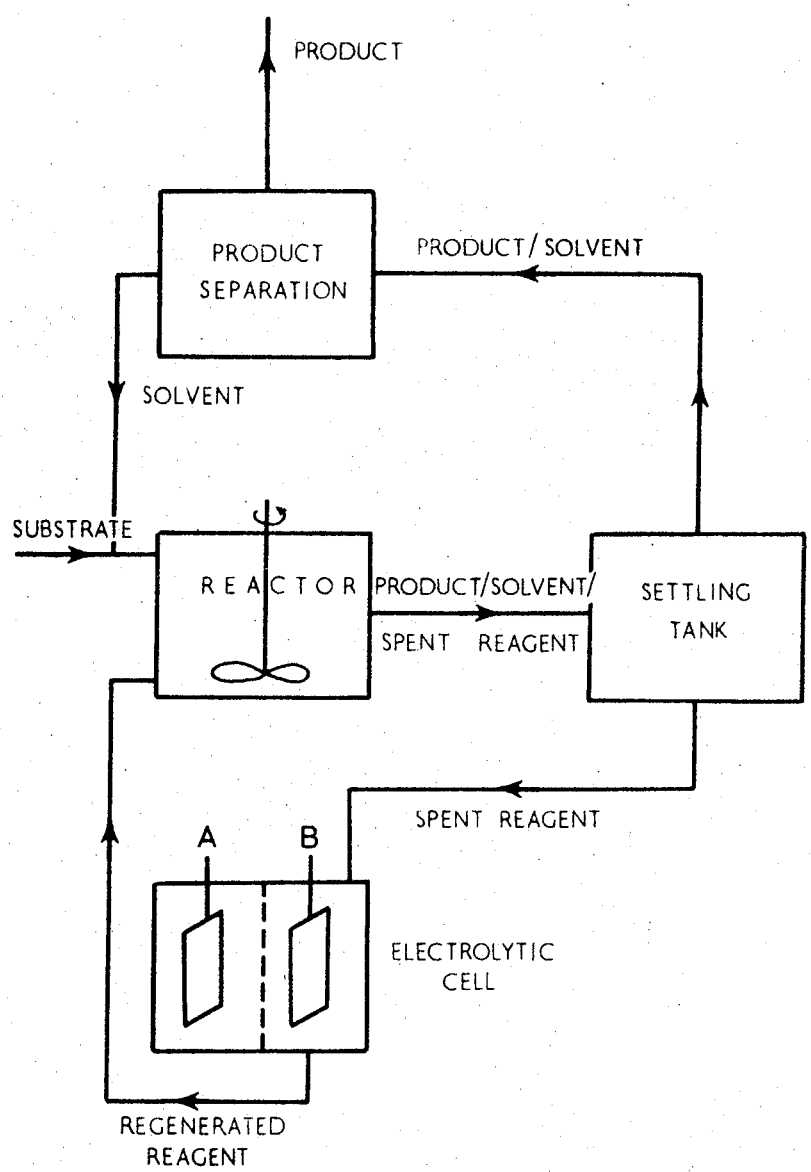

3,745,180
OXIDATION OF ORGANIC MATERIALS
Robert Allan Campbell Rennie, Runcorn, England, assignor to Imperial Chemical Industries, Limited, London, England
Filed Oct. 14, 1968, Ser. No. 767,189
Claims priority, application Great Britain, Oct. 23, 1967, 48,091/67
Int. Cl. C07c 49/66
U.S. Cl. 260—396 N               10 Claims

ABSTRACT OF THE DISCLOSURE

A process for reducing or oxidizing a substantially water-immiscible organic substrate by contacting a reagent comprising an aqueous solution of a compound of variable valency element, in which the variable valency element is in an appropriate oxidation state, with a solution of the organic substrate in a non-reactive, water-immiscible solvent, separating the two phases after reaction, and regenerating the reagent by electrolysis.

---

This invention relates to a process for oxidising or reducing organic compounds.

Solutions of variable valency elements are commonly used as reagents for the oxidation or reduction of organic substrates. For example secondary alcohols may be oxidised to ketones with hexavalent chromium, especially in the form of dichromates, diols may be oxidatively cleaved to yield aldehydes with periodic acid and aromatic nitro compounds may be reduced to corresponding amines with divalent tin. Since the reagent is usually used in the form of an aqueous solution of an inorganic salt, it has hitherto been considered necessary to operate under homogeneous reaction conditions, which necessitates the addition of a mutually miscible co-solvent, such as acetone or alcohol. The addition of a co-solvent adds to the expense of the process, since it must later be removed and may itself be reduced or oxidised in the course of the reaction.

We have devised a continuous process for carrying out reductions or oxidations of organic substrates which eliminates the need for co-solvents and provides for the regeneration of the reagent.

The present invention comprises a process for reducing or oxidising organic substrates by contacting a reagent comprising an aqueous solution of a compound of a variable valency element, in which the element is in an appropriate oxidation state, with a water-immiscible liquid organic substrate, separating the two phases after reaction and regenerating the reagent by electrolysis.

The term "liquid organic substrate" means the organic compound to be treated, when it is liquid, or a solution of the organic compound in a non-reactive water-immiscible solvent, if it is not liquid under the conditions of the reaction. When liquid substrates are used, further non-reactive water-immiscible co-solvents may be added.

As has been stated, the reagent is used in a state of oxidation (or reduction) appropriate to the reaction which it is intended to perform and thus the electrolytic regeneration involves conversion of the spent reagent back to its original oxidation state. For example, organic reductions may be carried out using divalent chromium which is itself oxidised to the trivalent form during the process. Regeneration is achieved by cathodic reduction which converts the chromium to its original divalent state. When chromium is used in its hexavalent form as an oxidising agent, the spent reagent will contain trivalent chromium. Regeneration is then carried out by anodic oxidation.

By the process of our invention, alcohols may be oxidise to aldehydes or acids by the use of hexavalent chromium, aromatic nitro-compounds may be reduced to amines with divalent tin, aromatic methyl groups may be oxidised to aldehyde groups with tetravalent cerium vic dihalides may be reduced to olefins, using chromous salts, such as the halides, aromatic hydrocarbons may be oxidised to quinones with tetravalent cerium, and the spent reagent regenerated electrolytically in each case.

The solution of the variable valency metal should be maintained at a pH at which a homogeneous aqueous solution is obtained. For many transition metal compounds, acid conditions are required to prevent precipitation of insoluble hydroxides.

Suitable non-reactive water immiscible solvents for the organic substrates are saturated aliphatic hydrocarbons, particularly those containing five to fifteen carbon atoms, for example, petroleum solvents and n-hexane. Ethers are also suitable solvents, and benzene may be used if oxidation conditions are not too severe. Chlorinated solvents may also be used in many cases.

Temperatures up to the boiling point of the solvent under the prevailing pressure may be used, though the tendency to by-product formation is best limited by keeping the temperature below about 100° C.

Since the organic substrate and aqueous reagent solution are essentially immiscible it is advisable to agitate the reaction mixture vigourously to maximise the area of contact between reagent and substrate. Stirring or vibration, including ultrasonic vibration, may be advantageously employed. After the reaction the two phases are separated and run off separately A convenient continuous process will now be described with reference to the attached drawing which is a simplified flow diagram of a process according to our invention.

The organic substrate is fed to an agitated reactor vessel, together with the reagent. The mixture of reacted substrate and spent reagent is allowed to separate in a settling tank from which the organic layer is passed to a product separation stage, which may often be a distillation or crystallisation apparatus. Recovered solvent may be used to take up more starting material, and is returned to the reactor. The aqueous layer of spent reagent is passed from the settling tank to the electrolytic cell for reageneration from where it is returned to the reactor.

Several reactor settling tank stages may be combined and arranged to give a multistage counter-current process.

The electrolytic cell which is used to regenerate the reagent may be undivided or it may have a porous partition or an ion exchange membrane between the electrodes A and B depending on the particular reagent used. The electrodes of the cell are constructed of a chemically inert conducting material. Anodes may be constructed of platinum, platinised titanium, carbon, or lead dioxide, and cathodes may be constructed of any of these materials, together with nickel or lead. Voltages of the appropriate polarity are applied at A and B: for regeneration by oxidation, electrode B will be positive while for reduction, the same electrode would be negative.

The spent reagent may be supplied to the electrolytic cell batch wise or continuously.

The process is illustrated by the following examples.

EXAMPLE 1

Reaction

A 500 ml. flask was fitted with a condenser, membrane-sealed Vibromixer stirring unit and a thermometer. A solution of ceric ammonium nitrate (45 millimoles) in nitric acid (4 N) was added and was heated to 50° C. A solution of toluene (10 millimoles) in purified petroleum ether (60–80°) was added, and the two phases were agitated vigorously. After 10 minutes, stirring was stopped and the two layers were allowed to reform. The aqueous layer was separated and extracted with methylene chloride and this extract was combined with the organic layer. After concentration by distillation a yield of benzaldehyde of about 70% (based on toluene) was obtained.

Regeneration

An electrolytic cell divided into anode and cathode compartments by an ion-exchange membrane was charged with the spent cerium reagent from the reaction stage. Using platinum electrodes and a current density of 100–120 amps. per square foot the ceric compound was regenerated with current efficiency of about 95%. The regenerated reagent was reused in a further oxidation stage.

EXAMPLE 2

The procedure of Example 1 was repeated using p-xylene (10 millimoles) p-tolualdehyde was obtained in a yield of 75%. The spent cerium solution was regenerated as described above.

EXAMPLE 3

Reaction 2,6-di-t-butyl phenol (2.1 g.) dissolved in hexane (200 ml.) was agitated with excess aqueous ceric ammonium nitrate solution (300 ml.; 0.3 molar). After 15 minutes the titre of the aqueous layer levelled out, indicating complete reaction. The layers were separated and the organic layer was evaporated down to give a red solid. Recrystallisation from pentane at −60° C. gave 2,2'; 6,6'-tetra-butyldiphenoquinone in substantially quantitative yield.

Regeneration

An undivided electrolytic cell was charged with the spent reagent from the reaction stage. Using platinised titanium electrodes and a current density of 50 amps. per square foot a current efficiency of 90% was obtained at 75% conversion of cerous to ceric. The regenerated reagent was reused in a further oxidation stage.

EXAMPLE 4

Reaction 5,6-dichlorocholesterol (1 g.) dissolved in ether (100 ml.) was agitated with an aqueous solution of chromous chloride (200 ml.; 0.15 molar) containing free hydrochloric acid, at reflux temperature. After 40 minutes the mixture was cooled and allowed to separate. The organic layer was washed with dilute sodium bicarbonate solution and evaporated. Recrystallisation gave pure cholesterol in 80% yield based on starting material.

Regeneration

Regeneration was carried out in a divided cell using either a porous ceramic diaphragm or an ion exchange membrane to separate the anode from the cathode. The depleted chromous solution which contained chromic salts and hydrochloric acid was fed to the cathode compartment of the cell. The anode compartment was charged with hydrochloric acid solution alone. The cell was provided with electrodes of graphite or, alternatively platinised titanium. The electrolysis was carried out with the exclusion of air by sealing the cell and providing a nitrogen blanket. At a potential difference of 2.5 volts the current density was 50–100 amps. per square foot, and under these conditions the current efficiency was 90% at 75% conversion of chromic to chromous chloride. Chlorine gas evolved at the anode was led off to a collection system. The regenerated chromous chloride solution was led from the cathode compartment and recycled to the reaction vessel.

EXAMPLE 5

Reaction

A solution of ceric ammonium nitrate in 2 N nitric acid (7.90 mls. containing 0.119 mole $Ce''''$) was placed in a 1 litre flask fitted with a condenser, thermometer dipping into the solution, and a sealed Vibromixer stirrer and heated to 50° C. A solution of naphthalene (1.91 g. 0.0149 mole) in purified ethylene dichloride (100 mls.) previously heated to 50° C., was added all at once, and the resultant mixture heated at 50° C. for 30 minutes.

The mixture was cooled to 20° C., the organic layer separated and the aqueous phase extracted with fresh ethylene dichloride (4× 60 mls.). The combined organic layers were washed with saturated sodium bicarbonate solution and dried over magnesium sulphate.

G.L.C. analysis of the extract showed that it contained 1,4 naphthaquinone (1.96 g. 0.0124 mole) and 1-nitronaphthalene (0.14 g.). The yield of naphthaquinone based on naphthalene converted was 83.2%.

Regeneration

An undivided electrolytic cell was charged with the spent reagent from the reaction stage. Using platinised titanium electrodes and a current density of 50 amps. per square foot a current efficiency of 90% was obtained at 75% conversion of cerous to ceric. The regenerated reagent was reused in a further oxidation stage.

What I claim is:

1. In a continuous process for reducing or oxidizing a water-immiscible organic substrate selected from the group consisting of aromatic hydrocarbon and aromatic hydrocarbon substituted with a member of the group consisting of hydroxy and chlorine by contacting the substrate in liquid phase with an aqueous solution of a water-soluble salt of a variable valency metal selected from the group consisting of chromium, cerium and tin, the improvement which comprises the stages of (1) feeding said substrate and said water-soluble salt of a variable valency metal to an agitated reaction vessel to cause reduction or oxidation of the substrate, (2) allowing reacted substrate and spent water-soluble salt of said variable valency metal to separate, (3) passing the substrate to a recovery state and recycling solvents, if any, to stage (1), (4) passing the aqueous layer of spent water-soluble salt of variable valency metal to an electrolytic cell for regeneration (5) recycling regenerated water-soluble salt of variable valency metal to stage (1).

2. In a process for reducing or oxidizing a water-immiscible organic substrate selected from the group consisting of aromatic hydrocarbon and aromatic hydrocarbon substituted with a member of the group consisting of hydroxy and chlorine by contacting the substrate in liquid phase with an aqueous solution of a water-soluble salt of a variable valency metal selected from the group consisting of chromium, cerium and tin, the improvement which comprises employing the substrate in solution in an inert, non-reactive, water-immiscible organic solvent, vigorously agitating the substrate and the aqueous solution of a water-soluble salt of a variable valency metal, separating the said aqueous and organic phases after completion of reaction, and regenerating the salt of the variable valency metal by electrolysis.

3. A process according to claim 2 for the production of aromatic aldehydes in which the substrate comprises a methyl substituted aromatic compound and the reagent comprises an aqueous solution of a ceric compound.

4. A process according to claim 3 in which the substrate is toluene or xylene.

5. A process according to claim 2 for the production of a diphenoquinone in which the substrate comprises a phenol and the aqueous solution of a water-soluble salt of a variable valency metal comprises a ceric compound.

6. A process according to claim 5 in which the substrate is 2,6-di-t-butylphenol.

7. A process according to claim 2 for the production of cholesterol in which the substrate comprises 5,6-dichlorocholesterol and the reagent comprises a chromous halide.

8. A process according to claim 2 wherein the substrate is selected from the group consisting of toluene, xylene, naphthalene and 2,6-di-t-butyl phenol and the aqueous solution of a water-soluble salt of a variable valency metal is an aqueous solution of ceric compound.

9. A process according to claim 8 wherein the ceric compound is ceric ammonium nitrate.

10. A process according to claim 2 wherein the substrate is a monocyclic or dicyclic aromatic hydrocarbon or a monocyclic aromatic hydrocarbon including a hydroxy substituent.

References Cited
UNITED STATES PATENTS

| | | | |
|---|---|---|---|
| 729,502 | 5/1903 | Moest | 204—78 |
| 3,486,992 | 12/1969 | Frye | 204—78 |

LORRAINE A. WEINBERGER, Primary Examiner

L. A. THAXTON, Assistant Examiner

U.S. Cl. X.R.

204—78; 260—396 R, 397.2, 599